US011653105B2

(12) United States Patent
Hua et al.

(10) Patent No.: US 11,653,105 B2
(45) Date of Patent: May 16, 2023

(54) INTENSITY SEPARATED LOCAL WHITE BALANCE CORRECTION

(71) Applicant: Texas Instruments Incorporated, Dallas, TX (US)

(72) Inventors: Gang Hua, Katy, TX (US); Shashank Dabral, Allen, TX (US); Mihir Narendra Mody, Bangalore (IN); Rajasekhar Reddy Allu, Plano, TX (US); Niraj Nandan, Plano, TX (US)

(73) Assignee: Texas Instmments Incorporated, Dallas, TX (US)

( * ) Notice: Subject to any disclaimer, the term of this patent is extended or adjusted under 35 U.S.C. 154(b) by 187 days.

(21) Appl. No.: 17/110,139

(22) Filed: Dec. 2, 2020

(65) Prior Publication Data

US 2022/0174249 A1 Jun. 2, 2022

(51) Int. Cl.
*H04N 23/88* (2023.01)
*H04N 23/74* (2023.01)
*H04N 23/71* (2023.01)
*H04N 9/78* (2006.01)
*H04N 23/76* (2023.01)
*H04N 23/741* (2023.01)

(52) U.S. Cl.
CPC ............ *H04N 23/88* (2023.01); *H04N 9/78* (2013.01); *H04N 23/71* (2023.01); *H04N 23/741* (2023.01); *H04N 23/76* (2023.01)

(58) Field of Classification Search
CPC .... H04N 9/735; H04N 5/2351; H04N 5/2355; H04N 5/243; H04N 9/78; H04N 23/88; H04N 23/71; H04N 23/741; H04N 23/76
See application file for complete search history.

(56) References Cited

U.S. PATENT DOCUMENTS

| 2003/0002736 | A1* | 1/2003 | Maruoka | H04N 1/4074 382/168 |
| 2003/0184660 | A1* | 10/2003 | Skow | H04N 9/735 348/223.1 |
| 2010/0110222 | A1 | 5/2010 | Smith et al. | |
| 2012/0081385 | A1* | 4/2012 | Cote | H04N 9/735 345/589 |
| 2012/0274798 | A1* | 11/2012 | Takahashi | H04N 9/735 348/222.1 |
| 2014/0152694 | A1* | 6/2014 | Narasimha | G06T 5/50 345/629 |

(Continued)

OTHER PUBLICATIONS

"TDA4VM Jacinto Automotive Processors for ADAS and Autonomous Vehicles Silicon Revision 1.0", SPRSP36E, Texas Instruments, Inc., Feb. 2019, Revised Dec. 2019, pp. 1-311.

*Primary Examiner* — Abdelaaziz Tissire
(74) *Attorney, Agent, or Firm* — Carl G. Peterson; Frank D. Cimino (57) ABSTRACT

A method for local automatic white balance (AWB) of wide dynamic range (WDR) images is provided that includes collecting statistics for local AWB by an image signal processor (ISP) from a first WDR image generated by the ISP, receiving, by the ISP, a plurality of local gain lookup tables (LUTs), one for each color channel, wherein the plurality of local gain LUTs is generated using the statistics, and applying, by the ISP, a gain value to each pixel in a second WDR image generated by the ISP, wherein the gain value for the pixel is determined by the ISP using the local gain LUT for the color channel of the pixel.

18 Claims, 4 Drawing Sheets

(56) References Cited

U.S. PATENT DOCUMENTS

| | | | |
|---|---|---|---|
| 2016/0275651 A1* | 9/2016 | Wang | G06T 5/00 |
| 2017/0223267 A1* | 8/2017 | Dabral | H04N 5/2353 |
| 2017/0339325 A1 | 11/2017 | Dabral et al. | |
| 2018/0109715 A1 | 4/2018 | Mangla et al. | |
| 2019/0104245 A1 | 4/2019 | Dabral et al. | |
| 2019/0313005 A1* | 10/2019 | Kuang | H04N 5/2355 |
| 2021/0044785 A1* | 2/2021 | Hsiao | H04N 9/73 |

* cited by examiner

INTENSITY SEPARATED LOCAL WHITE BALANCE CORRECTION

BACKGROUND

Digital cameras typically have a color cast that tints the final image unless corrected. Image signal processors (ISPs) correct for this tint using a process referred to as automatic white balance (AWB) in which global color specific gains are computed and applied to respective color channels in the image. The same gain values are applied across the entire image, which works well under simple lighting conditions. However, under mixed lighting conditions such as those that occur, for example, in automotive applications, security systems, and industrial imaging using wide dynamic range (WDR) sensors, the use of global color specific gains may only correct part of the image properly.

SUMMARY

Embodiments of the present disclosure relate to intensity separated local white balance correction. In one aspect, a method for local automatic white balance (AWB) of wide dynamic range (WDR) images is provided that includes collecting statistics for local AWB by an image signal processor (ISP) from a first WDR image generated by the ISP, receiving, by the ISP, a plurality of local gain lookup tables (LUTs), one for each color channel, wherein the plurality of local gain LUTs is generated using the statistics, and applying, by the ISP, a gain value to each pixel in a second WDR image generated by the ISP, wherein the gain value for the pixel is determined by the ISP using the local gain LUT for the color channel of the pixel.

In one aspect, a system-on-a-chip (SoC) is provided that includes an image signal processor (ISP) configured to collect statistics for local automatic white balance (AWB) from wide dynamic range (WDR) images and to apply a gain value to each pixel of a WDR image generated by the ISP, wherein the gain value to be applied to a pixel is determined by the ISP using a local gain lookup table (LUT) for a color channel of the pixel, a memory configured to store software instructions implementing a local automatic white balance (AWB) gain computation algorithm that generates a local gain LUT for each color channel using statistics collected by the ISP, and at least one processor coupled to the memory to execute the software instructions.

In one aspect, an image signal processor (ISP) is provided that includes a front end component including functionality to merge multiple wide dynamic range (WDR) exposures received from a multi-exposure WDR sensor into single WDR images, a statistics collection component including functionality to collect statistics for local automatic white balance from each WDR image, storage for a plurality of local gain lookup tables (LUTs), one for each color channel; wherein the local gain LUTs are generated based on statistics collected by the statistics collection component, and a local automatic white balance (LAWB) component including functionality to determine a local gain value for each pixel in a WDR image based on a local AWB gain value in the local gain LUT for the color channel of the pixel corresponding to an intensity value for the pixel calculated by the LAWB component, and to apply the local gain value to the pixel.

DETAILED DESCRIPTION

Specific embodiments of the disclosure are described herein in detail with reference to the accompanying figures. Like elements in the various figures are denoted by like reference numerals for consistency.

Wide dynamic range (WDR) sensors are increasingly used, for example, in automotive applications and surveillance applications, to preserve the full dynamic range of a natural scene. Automotive applications, for example, can include rear view cameras for assisting a driver while backing up, and other cameras for providing inputs to control systems for avoiding obstacles and controlling braking, steering, and acceleration. As previously mentioned, prior art image signal processors provide automatic white balance of images in which global gains are applied to respective color channels in an image. However, the use of global gains for white balance may only correct part of an image properly under mixed light conditions in applications using WDR sensors.

Embodiments of the disclosure provide for local automatic white balance (AWB) of pixels in a WDR image based on local intensity measurements. Rather than having a respective global gain for each color channel as in the prior art, local gain look-up tables (LUTs) are generated for each color channel based on multiple lighting conditions or intensity ranges. The local gain LUTs map local AWB gains for the intensity ranges to pixel intensity. To determine the gain to be applied to a pixel in a WDR image, an intensity value is calculated for the pixel and used to locate the local AWB gain value for the intensity range that includes the intensity value. The gain to be applied to the pixel is calculated based on the local AWB gain value, the intensity associated with that local AWB gain value, and the intensity value calculated for the pixel.

Figure 1:
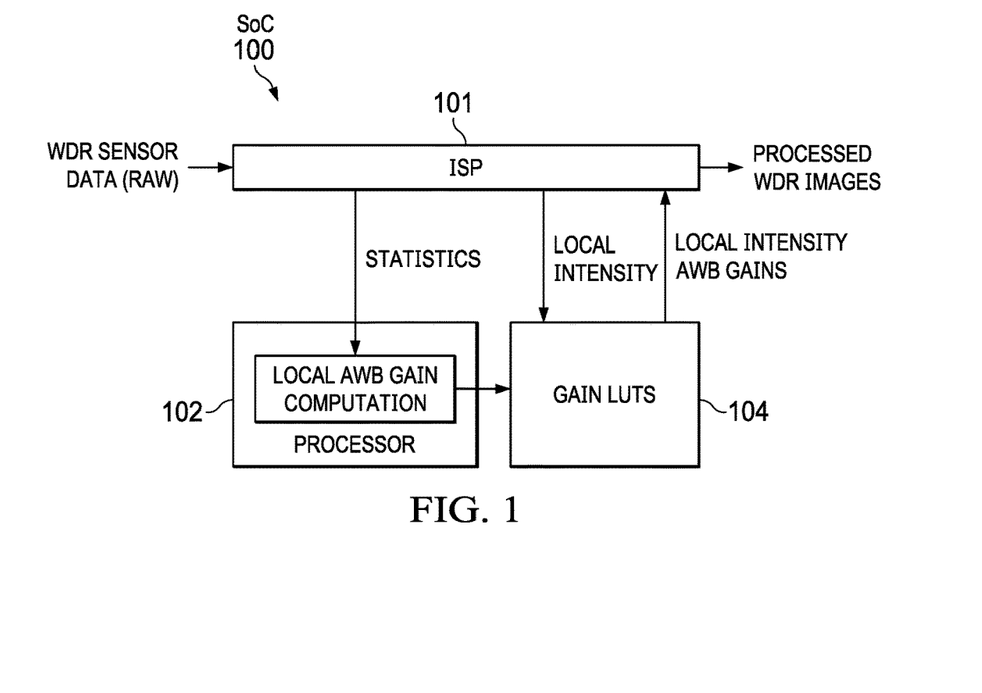
FIG. 1 is a simplified block diagram illustrating an example of local automatic white balance (AWB) of a wide dynamic range (WDR) image in a system on a chip (SoC)

FIG. 1 is a simplified block diagram illustrating an example of local automatic white balance (AWB) in a system on a chip (SoC) 100 in accordance with some embodiments. The SoC includes an image signal processor (ISP) 101, a processor 102 for executing a local AWB gain computation algorithm to generate gain look-up tables for local AWB, and storage 104 for the gain look-up tables (LUTs), e.g., memory mapped registers. The ISP 101 includes functionality to receive raw WDR sensor data from a multi-exposure WDR sensor (not shown) and to perform various WDR image processing operations on the raw sensor data to generate processed WDR images. The raw sensor data comes in the form of a color filter array (CFA) which is an m×n array of pixels (where m and n are the dimensions of the sensor) in which each pixel carries information about one color channel. The CFA pixel array may use any 2×2 color pattern, e.g., RGBC, RCCB, or RGGB. For simplicity of explanation in examples herein, the CFA pixel pattern is assumed to be the 2×2 Bayer pattern (RGGB).

The WDR image processing operations may include decompanding, merging of the multiple exposures into a single WDR image, defective pixel correction (DPC), lens shading correction, spatial noise filtering, brightness and contrast enhancement, demosaicing, and color enhancement. In addition, the ISP 101 is configured to collect statistics from the WDR images for the local AWB gain computations and to provide the statistics to the processor 102. A control program (not shown) sets various configuration parameters for the statistics collection.

In this example, the statistics collection in the ISP 101 operates on pixel bit depths that are smaller than the pixel bit depth of a WDR image. Accordingly, to collect statistics for the entire pixel bit depth of a WDR image as is needed for the local AWB gain computations, statistics are collected using two or more bit ranges that taken together span the bit depth of a WDR image pixel. The bit ranges are used in round robin fashion in respective consecutive WDR images, e.g., if two bit ranges are specified, statistics for each bit range will be collected in respective two consecutive WDR images. Any suitable bit ranges may be used and the ranges may overlap. The particular bit ranges and the number of bit ranges to be used are configurable by the control program.

For simplicity of explanation herein, the pixel bit depth for statistics collection is assumed to be 10 bits and the WDR pixel bit depth is assumed to be 20 bits. Further, three bit ranges R1, R2, R3 are assumed where R1=bit 0-bit 9, R2=bit 6-bit 15, and R3=bit 10-bit 19. To collect the statistics in the three bit ranges in round robin fashion across the consecutive WDR images W1, W2, W3, W4, W5, W6, W7, . . . , being generated by the ISP 101, R1 is used for statistics collection in W1, R2 is used for statistics collection in W2, R3 is used for statistics collection in W3, R1 is used for statistics collection in W4, R2 is used for statistics collection in W5, R3 is used for statistics collection in W6, R1 is used for statistics collection in W7, etc.

The processor 102 executes a user provided local AWB gain computation algorithm that combines the statistics collected according to the three bit ranges to estimate statistics for the full dynamic range of a WDR image and uses the estimated statistics to generate the local gain LUTs for respective color channels based on three lighting conditions or intensity ranges. Each local gain LUT maps local AWB gains for the intensity ranges to pixel intensity. The local gain LUTS are stored in the storage 104. The local AWB gain computation algorithm receives statistics for each WDR frame after the WDR frame is processed by the ISP 100 and uses the received statistics to generate the local gain LUTs. New local gain LUTs are generated each time the local AWB gain computation algorithm receives statistics for a WDR image.

Note that the statistics for a WDR frame will have been collected using one of the three bit ranges. To estimate the statistics for the full dynamic range of a WDR image, the local AWB gain computation algorithm needs statistics from all of the specified bit ranges, which means that the local AWB computation gain computation algorithm needs statistics from the current WDR image as well as the two previous WDR images. For example, assume that statistics are collected for R1 in W1, R2 in W2, and R3 in W3. These three sets of statistics span the 20-bit dynamic range of WDR image pixels. The estimation portion of the local AWB gain computation algorithm combines the R1/W1 statistics, the R2/W2 statistics, and the R3/W3 statistics to estimate statistics for a WDR image. The estimated statistics are then used by the local AWB gain computation algorithm to generate the four local gain LUTS.

The local AWB gain computation algorithm then receives the statistics collected for R1 in W4. The estimation portion of the local AWB computation algorithm combines the R1/W4 statistic with the R2/W2 statistics and the R3/W3 statistics to estimate statistics for a WDR image. The estimated statistics are then used by the local AWB gain computation algorithm to generate the four local gain LUTS. The local AWB gain computation algorithm then receives the statistics collected for R2 in W5. The estimation portion of the local AWB computation algorithm combines the R2/W5 statistics with the R3/W3 statistics and the R1/W4 statistics to estimate statistics for a WDR image. The estimated statistics are then used by the local AWB gain computation algorithm to generate the four local gain LUTS. This statistics estimation and local gain LUT generation is repeated for each received set of statistics from a WDR image.

Figure 2:
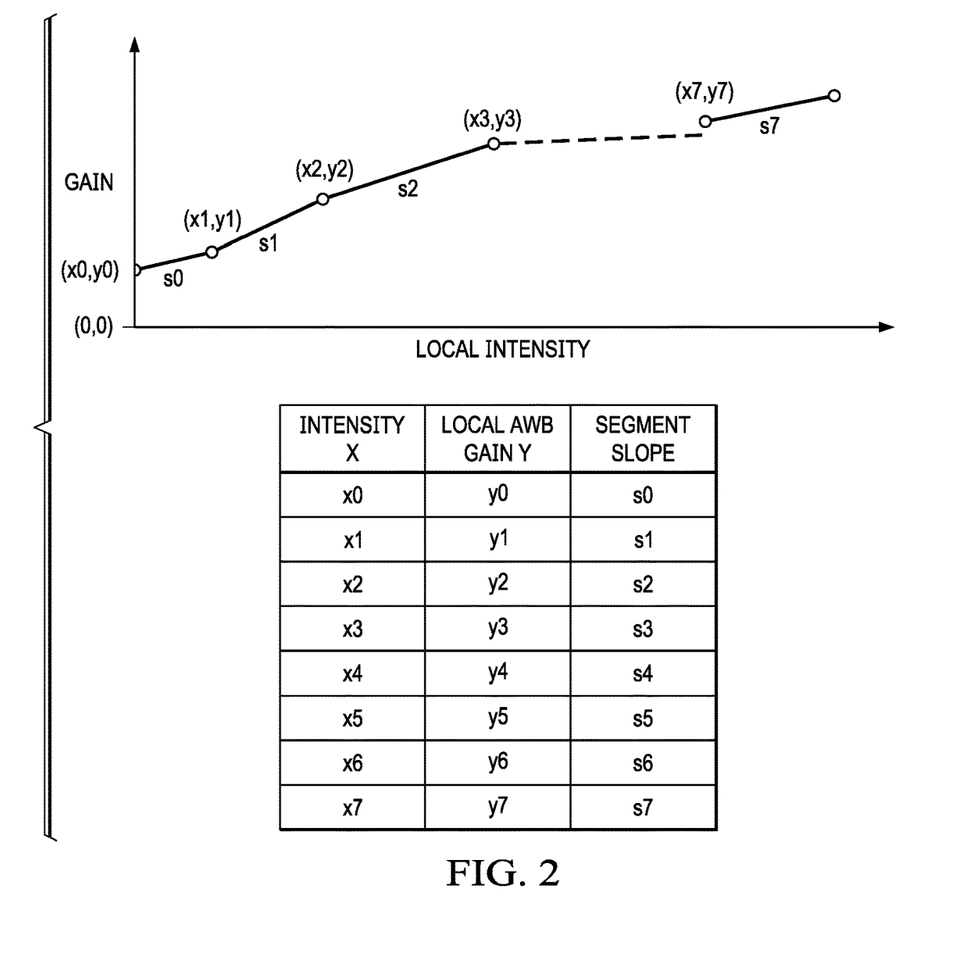
FIG. 2 shows an example piecewise linear (PWL) curve and an example gain lookup table (LUT) for the PWL curve.

In this example, each local gain LUT is generated according to a piecewise linear (PWL) curve plotting local gain versus intensity with eight knee points and each LUT has eight entries, one for each knee point. The part of the PWL curve between two knee points may be referred to as an intensity range segment herein. Each entry in a LUT includes an intensity, a local AWB gain value corresponding to the intensity, and the slope of the intensity range segment between the knee point corresponding to the entry and the next knee point in the PWL curve. FIG. 2 shows an example piecewise linear (PWL) curve plotting gain versus intensity with eight knee points and an example local gain LUT for the PWL curve.

The ISP 101 includes functionality to determine and apply local AWB gain values to each pixel of a WDR image using the four local gain LUTs available after the WDR image is generated. More specifically, for each pixel in a WDR image, the ISP 101 calculates an intensity value. As is explained in more detail below, this intensity value may be calculated as a weighted average of the pixel value and one or more neighboring pixel values in the WDR image. A weighted average is used because a local average of pixel values is a more robust measure of local image intensity than the value of a single pixel.

The ISP 101 uses the calculated intensity value to search the local gain LUT for the color channel of the pixel to find the local AWB gain value for the intensity range segment that includes the calculated intensity value. The ISP 101 then uses this local AWB gain value to determine the gain value to be applied to the pixel. For example, referring to FIG. 2, if the calculated intensity value x for a pixel is greater than or equal to x2 and less than x3, then x is included in the intensity range segment between x2 and x3 and y2 is the local AWB gain value for the intensity range segment. The gain value y to be applied to the pixel is determined by linear interpolation, i.e., $y=y2+(x-x2)s2$. The ISP 101 then applies the determined gain value to the pixel.

Figure 3:
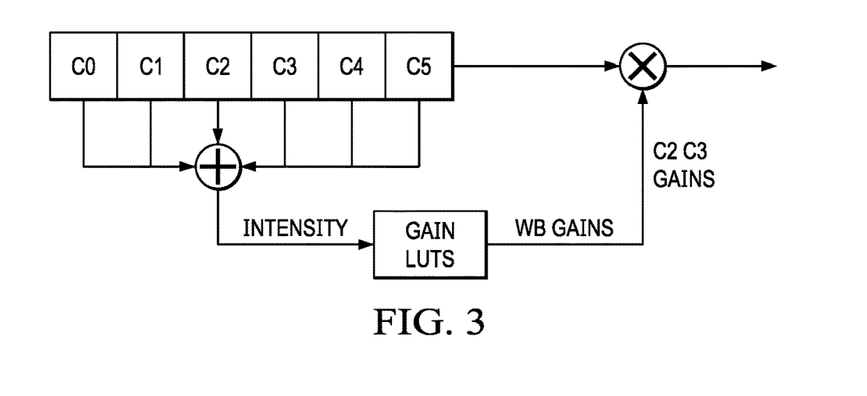
FIGS. 3-5 are examples of techniques for calculating intensity values for sets of neighboring pixels.

In this example, the ISP 101 calculates an intensity value for each pixel in a WDR image as illustrated in the example of FIG. 3. In this example, pixels C0, C2, and C4 are in the green color channel and pixels C1, C3, and C5 are in the red color channel. An intensity value for two pixels at a time is calculated based on a 1×N, e.g., N=6, sliding window of sequential pixels in a row of the WDR image. As shown in FIG. 3, an intensity value for the center two pixels, C2 and C3, of the six pixel window is calculated as a weighted average of the intensities of the six pixels. The weights are used to estimate the scene light intensity and are parameters that may be set by user.

The calculated intensity value is then used to index a respective green local gain LUT to extract the information needed for the ISP 101 to determine a gain value for C2 and to index the red local gain LUT to extract the information needed for the ISP 101 to determine a gain value for C3. To calculate an intensity for the next pixel pair, C4 and C5, the window is moved to the right in the image row by two pixels such that C4 and C5 are at the center of the window.

Figures 4, 5, 6:
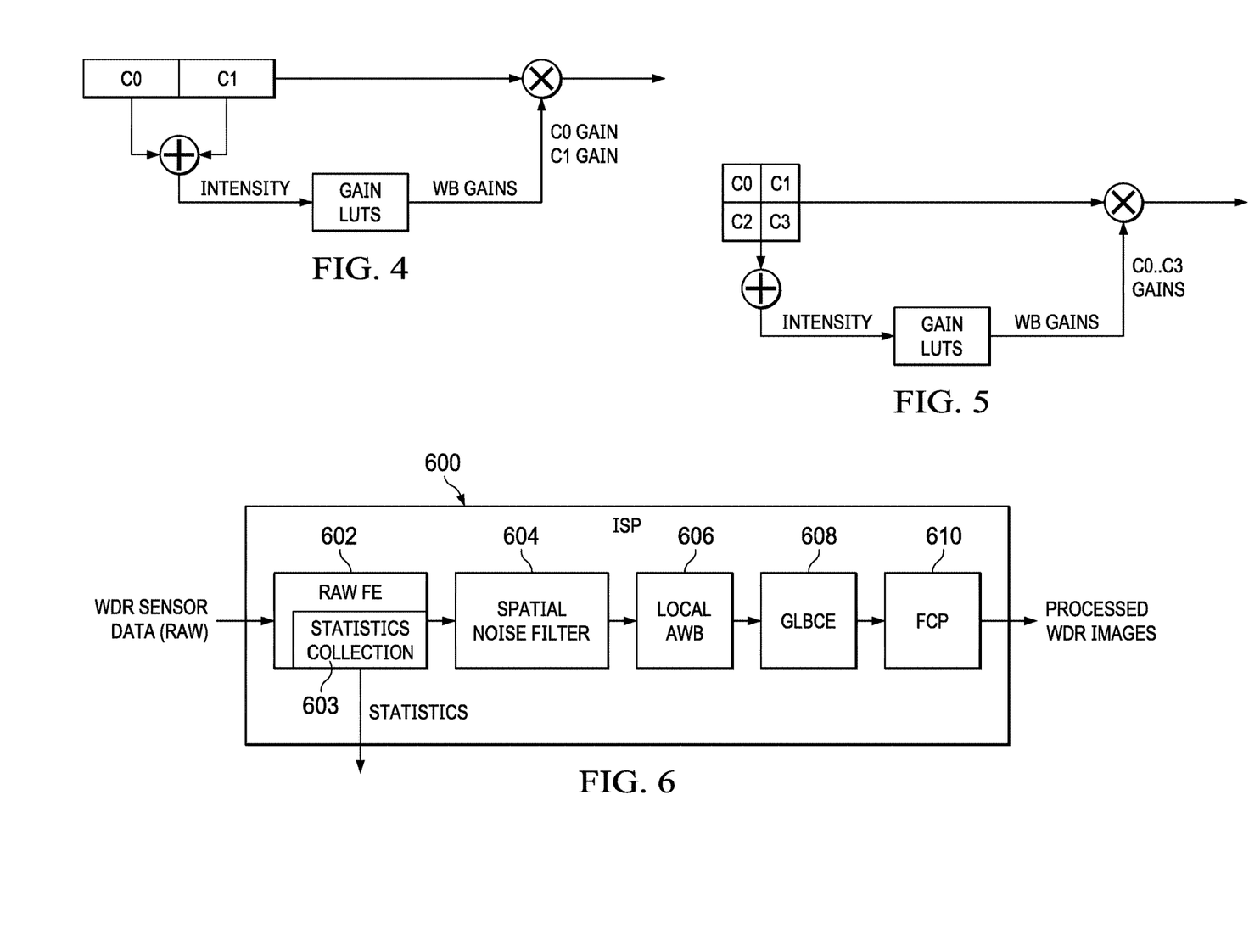
FIG. 6 is a simplified block diagram of an example image signal processor (ISP)

In some embodiments, the ISP 101 may calculate intensity values in other ways. FIG. 4 and FIG. 5 are examples illustrating two other possible ways to calculate intensity values. As shown in FIG. 4, an intensity value for pairs of sequential pixels in a row of the can be calculated as a weighted average of the intensities of the two pixels. The calculated intensity value is then used to index the respective local gain LUT for each pixel to extract the information needed to determine a gain value for the pixel. In this example, C0 is green and C1 is red.

As shown in FIG. 5, an intensity value for all pixels in 2×N blocks of pixels, e.g., N=2, spanning two rows of the WDR image can be calculated as a weighted average of the intensities of the pixels in the block. The calculated intensity value is then used to index the respective local gain LUT for each pixel to extract the information needed to determine a gain value for the pixel. In this example, C0 is red, C1 and C2 are green, and C3 is blue.

FIG. 6 is a simplified block diagram of an example ISP 600 suitable for use as the ISP 101 of FIG. 1. The ISP 600 implements a WDR image processing pipeline that includes a raw front end (FE) component 602, a spatial noise filter component 604, a local automatic white balance (LAWB) component 606, a global/local brightness and contrast enhancement (GLBCE) component 608, and a flexible color processing (FCP) component 610.

The raw FE component 602 operates as an image processing front end in the raw domain. The raw FE component 602 includes functionality to receive raw WDR sensor data from a multi-exposure WDR sensor and perform raw pixel processing operations such as decompanding of each exposure, merging the multiple exposures into a single WDR image, defective pixel correction, and lens shading correction. The raw FE component 602 also includes a statistics collection component 603. The statistics collection component 603 includes functionality to collect the statistics for multiple independent bit ranges as previously described herein for generating the local gain LUTs for the local automatic white balance. The collected statistics are stored in memory (not shown) for use by the local AWB gain computation algorithm.

The spatial noise filter component 604 includes functionality to perform spatial noise filtering on the WDR image received from the raw FE component 602.

The LAWB component 606 includes functionality to determine a local gain value for each pixel in the WDR image received from the spatial noise filter component 604 and to apply the determined gain values to the pixels. More specifically, the LAWB component 606 includes functionality to calculate an intensity value for each pixel. The calculated intensity value is used to find a local AWB gain value for the intensity range segment that includes the intensity value in the local gain LUT for to the color channel of the pixel. The LAWB component 606 further includes functionality to determine the gain value to be applied to the pixel by linear interpolation based on the local AWB gain, the intensity value associated with the local AWB gain in the local gain LUT, and the slope of the intensity range segment. Calculation of intensity values and determination of gain values are previously described herein.

The GLBCE component 608 includes functionality to perform global and local brightness and contrast enhancement on the WDR image received from the LAWB component 606.

The FCP component 610 includes functionality to perform demosaicing and color conversion on the WDR image received from the GLBCE component 608. The WDR image output by the FCP component 610 is stored in memory (not shown) for further processing by other hardware components, e.g., a vision processing accelerator, of the SoC 100 and/or applications executing on processors in the SoC.

Figure 7:
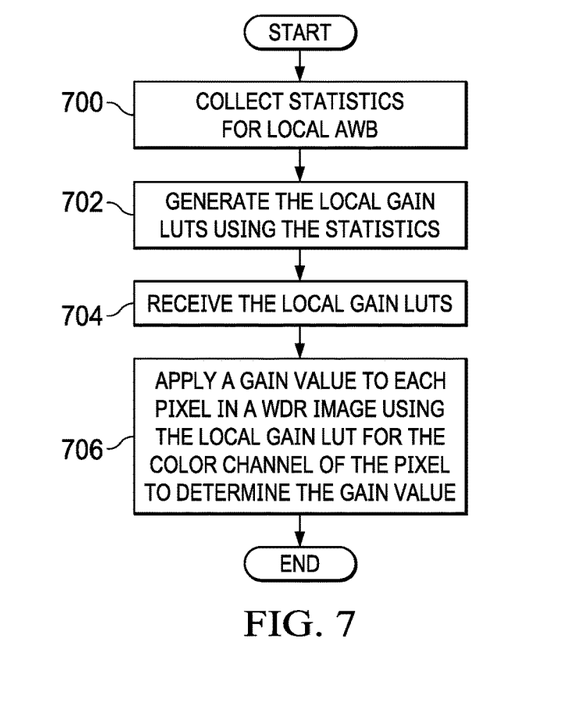
FIG. 7 is a flow diagram of a method for local AWB of a WDR image.

FIG. 7 is a flow diagram of a method for local automatic white balance of a WDR image in accordance with some embodiments. Initially, statistics for local AWB are collected 700 by an ISP, e.g., ISP 101 of FIG. 1, in a system-on-a-chip (SoC) and stored in memory. A local AWB gain computation algorithm executing on a processor in the SoC, e.g., the processor 102 of FIG. 1, generates 702 the local gain LUTs using the statistics. The ISP receives 704 the local gain LUTs and applies 706 a gain value to each pixel in a WDR image using the local gain LUT for the color channel of the pixel to determine the gain value.

Figure 8:
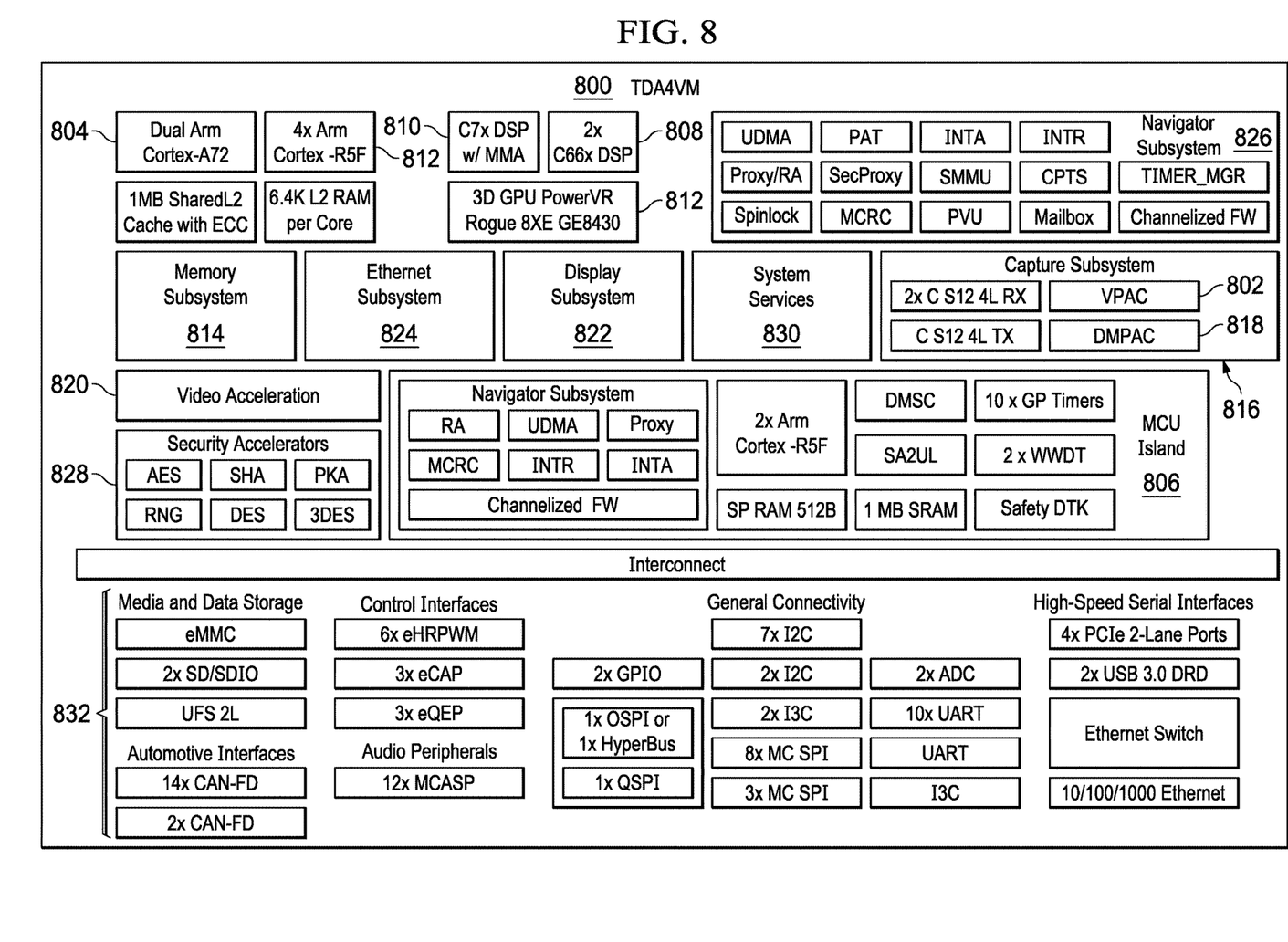
FIG. 8 is a high level block diagram of an example multiprocessor system on a chip (SoC)

FIG. 8 is a high level block diagram of an example multiprocessor system-on-a-chip (SoC) 800 that may be configured to perform embodiments of local automatic white balance as described herein. In particular, the example SoC 800 is an embodiment of the TDA4VM SoC available from Texas Instruments, Inc. A high level description of the components of the SoC 800 is provided herein. More detailed descriptions of example components may be found in "TDA4VM Jacinto™ Automotive Processors for ADAS and Autonomous Vehicles Silicon Revision 1.0," Texas Instruments, SPRSP36E, February, 2019, revised December, 2019, pp. 1-311, which is incorporated by reference herein.

The SoC 800 includes numerous subsystems across different domains such as one dual-core 64-bit Arm® Cortex®-A72 microprocessor subsystem 804, a microcontroller unit (MCU) island 806, based on two dual-core Arm® Cortex®-R5F MCUs, four additional dual-core Arm® Cortex®-R5F MCUs 812 in the main domain, two C66x floating point digital signal processors (DSPs) 808, one C71x floating point, vector DSP 810, that includes a deep-learning matrix multiply accelerator (MMA), and 3D graphics processing unit (GPU) 812. The SoC 800 further includes a memory subsystem 814 including up to 8 MB of on-chip static random access memory (SRAM), an internal DMA engine, a general purpose memory controller (GPMC), and an external memory interface (EMIF) module (EMIF). In addition, the SoC 800 includes a capture subsystem 816 with two camera streaming interfaces, a vision processing accelerator (VPAC) 802 including one or more image signal processors (ISPs), a depth and motion processing accelerator (DMPAC) 818, and a video acceleration module 820. The SoC 800 also includes a display subsystem 822, an ethernet subsystem 824, a navigator subsystem 826, various security accelerators 828, support for system services 830, and a variety of other interfaces 832.

Software instructions implementing a local AWB gain computation algorithm that generates the local gain LUTs for local automatic white balance as described herein may be stored in the memory subsystem 814 (e.g., a computer readable medium) and may execute on one or more programmable processors of the SOC 800, e.g., the DSP 810. Further, the one or more ISPs in the VPAC 802 may be, for example, embodiments of the ISP 600 of FIG. 6.

Other Embodiments

While the disclosure has been described with respect to a limited number of embodiments, those skilled in the art, having benefit of this disclosure, will appreciate that other embodiments can be devised which do not depart from the scope disclosed herein.

For example, embodiments have been described herein in which statistics for computation of local AWB gains are collected in multiple bit ranges in respective consecutive WDR images because the pixel bit depth of the statistics collection is smaller than the pixel bit depth of a WDR image. In other embodiments, the pixel bit depth of the statistics collection may be sufficient to process the pixel bit depth of a WDR image and the statistics needed to compute the local AWB gains may be collected for the entire dynamic range in each WDR image. In such embodiments, the AWB gain computation algorithm would not include statistics estimation as previously described herein.

In another example, embodiments have been described herein in which the slope of each intensity range segment is included in each local gain LUT. In other embodiments, the slope may not be present and can be calculated by the ISP as part of the linear interpolation to determine the actual gain value to be applied to a pixel.

In another example, embodiments have been described herein in which the local gain LUTs consist of eight entries. In other embodiments, the LUTs may have more or few entries.

In another example, embodiments have been described herein in which the local gain LUTs are generated based on three intensity ranges. In other embodiments, more or fewer intensity ranges may be used.

It is therefore contemplated that the appended claims will cover any such modifications of the embodiments as fall within the true scope of the disclosure.

What is claimed is:

1. A method for local automatic white balance (AWB) of wide dynamic range (WDR) images, the method comprising:
    collecting statistics for local AWB by an image signal processor (ISP) from a first WDR image generated by the ISP;
    receiving, by the ISP, a plurality of local gain lookup tables (LUTs), one for each color channel, wherein the plurality of local gain LUTs is generated using the statistics;
    calculating, by the ISP, an intensity value for each pixel;
    searching, by the ISP, the local gain LUT for the color channel of each pixel to find a local AWB gain value for an intensity range segment that includes the calculated intensity value of that pixel; and
    applying, by the ISP, a gain value to each pixel in a second WDR image generated by the ISP based on the local AWB gain value for that pixel.

2. The method of claim 1, wherein applying further comprises:
    determining, by the ISP, the gain value for each pixel by linear interpolation based on the corresponding local AWB gain value, an intensity value associated with the corresponding local AWB gain in the local gain LUT for the color channel of the pixel, and a slope of the intensity range segment.

3. The method of claim 2, wherein calculating further comprises calculating the intensity value for each pixel as a weighted average of a value of that pixel with at least one neighboring pixel value.

4. The method of claim 2, wherein calculating further comprises calculating the intensity value for each pixel as a weighted average of values of pixels in a 1×6 window of pixels in which that pixel is one of two center pixels in the window.

5. The method of claim 1, wherein each local gain LUT of the plurality of local gain LUTs includes eight entries, wherein each entry comprises an intensity and a local AWB gain value corresponding the intensity.

6. A method for local automatic white balance (AWB) of wide range dynamic (WDR) images, the method comprising:
    collecting statistics for local AWB by an image signal processor (ISP) from a first WDR image generated by the ISP;
    receiving, by the ISP, a plurality of local gain lookup tables (LUTs), one for each color channel, wherein the plurality of local gain LUTs is generated using the statistics; and
    applying, by the ISP, a gain value to each pixel in a second WDR image generated by the ISP, wherein the main value for the pixel is determined by the ISP using the local gain LUT for the color channel of the pixel,
    wherein collecting statistics further comprises collecting first statistics from the first WDR image using a first bit range and collecting second statistics from a third WDR image generated by the ISP using a second bit range, and wherein the plurality of local gain LUTs is generated using the first statistics and the second statistics.

7. A system-on-a-chip (SoC) comprising:
    an image signal processor (ISP) configured to collect statistics for local automatic white balance (AWB) from wide dynamic range (WDR) images and to apply a gain value to each pixel of a WDR image generated by the ISP, wherein the gain value to be applied to a pixel is determined by the ISP using a local gain lookup table (LUT) for a color channel of the pixel;
    a memory configured to store software instructions implementing a local automatic white balance (AWB) gain computation algorithm that generates a local gain LUT for each color channel using statistics collected by the ISP; and
    at least one processor coupled to the memory to execute the software instructions,
    wherein the collected statistics include a first set of statistics collected using a first bit range and a second set of statistics collected using a second bit range, and the local gain LUT for each color channel is generated using the first and second set of statistics.

8. The SoC of claim 7, wherein the ISP is further configured to determine the gain value to be applied to a pixel based on a local AWB gain value from the local gain LUT for the color channel of the pixel, wherein the local AWB gain is located in the local gain LUT for the color channel of the pixel using an intensity value for the pixel calculated by the ISP.

9. The SoC of claim 8, wherein the ISP is further configured to calculate the intensity value of a pixel as a weighted average of a value of the pixel with at least one neighboring pixel value.

10. The SoC of claim 8, wherein the ISP is further configured to calculate the intensity value of a pixel as a weighted average of values of pixels in a 1×6 window of pixels in which the pixel is one of two center pixels in the window.

11. The SoC of claim 8, wherein the ISP is further configured to determine the gain value to be applied to a pixel by linear interpolation based on the local AWB gain value, an intensity value associated with the local AWB gain value in the local gain LUT for the color channel of the pixel, and a slope of an intensity range segment that includes the intensity value calculated for the pixel.

12. The SoC of claim 7, wherein each local gain LUT includes eight entries, wherein each entry comprises an intensity and a local AWB gain corresponding the intensity.

13. The SoC of claim 7, wherein:
the first set of statistics is collected from a first WDR image using first bit range and the second set of statistics is collected from a second WDR image using the second bit range.

14. An image signal processor (ISP), comprising:
a front end component comprising functionality to merge multiple wide dynamic range (WDR) exposures received from a multi-exposure WDR sensor into single WDR images;
a statistics collection component comprising functionality to collect statistics for local automatic white balance from each WDR image;
storage for a plurality of local gain lookup tables (LUTs), one for each color channel; wherein the local gain LUTs are generated based on statistics collected by the statistics collection component, and each local gain LUT contains multiple local AWB gain values for multiple intensity ranges, respectively; and
a local automatic white balance (LAWB) component comprising functionality to determine a local gain value for each pixel in a WDR image based on a local AWB gain value in the local gain LUT for the color channel of the pixel corresponding to an intensity value for the pixel calculated by the LAWB component, and to apply the local gain value to the pixel.

15. The ISP of claim 14, wherein the LAWB component is further configured to calculate the intensity value of a pixel as a weighted average of a value of the pixel with at least one neighboring pixel value.

16. The ISP of claim 14, wherein the LAWB component is further configured to calculate the intensity value of a pixel as a weighted average of values of pixels in a 1×6 window of pixels in which the pixel is one of two center pixels in the window.

17. The ISP of claim 14, wherein each local gain LUT includes eight entries, wherein each entry comprises an intensity and a local AWB gain corresponding the intensity.

18. The ISP of claim 14, wherein the LAWB component is further configured to determine the gain value to be applied to a pixel by linear interpolation based on the local AWB gain value, an intensity value associated with the local AWB gain value in the local gain LUT for the color channel of the pixel, and a slope of an intensity range segment that includes the intensity value calculated for the pixel.

* * * * *